3,631,068
PROCESS FOR CONVERTING A MIXED TOCOPH-EROL CONCENTRATE TO ESSENTIALLY ALL ALPHA-TOCOPHEROL
Donald R. Nelan, Rush, N.Y., assignor to Eastman Kodak Company, Rochester, N.Y.
No Drawing. Filed Dec. 15, 1969, Ser. No. 885,347
Int. Cl. C07d 7/22
U.S. Cl. 260—345.5                      5 Claims

ABSTRACT OF THE DISCLOSURE

A tocopherol concentrate containing non alpha-tocopherols, such as one containing alpha, beta, gamma, and delta-tocopherols, is converted to essentially all alpha-tocopherol by reacting with the mixed concentrate an aldehyde such as formaldehyde and a hydrogen halide such as hydrogen chloride in the presence of metallic tin as a reducing agent.

BACKGROUND OF THE INVENTION

Field of the invention

The present invention relates to a novel process for converting a mixed tocopherol concentrate to essentially all alpha-tocopherol.

The prior art

Tocopherol concentrates as manufactured from deodorizer sludge generally contain a mixture of alpha, beta, gamma, and delta-tocopherols. Such deodorizer sludge is a waste product from air blowing vegetable or cereal grain oils such as soybean oil, cottonseed oil, wheat germ oil and the like. The various chemical and physical steps for obtaining tocopherol concentrates from deodorizer sludge are well known. Tocopherol concentrates have been made synthetically by reacting isophytol with methyl or dimethyl hydroquinones. Such concentrates also contain non alpha-tocopherols.

The non alpha-tocopherols such as beta, gamma, and delta-tocopherols have relatively low biological potency and have been converted to the more desirable high potency alpha-tocopherol by chloromethylation and reduction, using either zinc powder or stannous chloride as reducing agent, as described in U.S. Pat. 2,486,542 granted to Weisler and Chechak on Nov. 1, 1949. When using zinc powder as the reducing agent, less than 100% conversion to the alpha-tocopherol is obtained, and the yield of alpha-tocopherol expressed as a percent of the total tocopherols in the starting concentrate is much lower than desired.

When stannous chloride is used as the reducing agent, the conversion and recovery of alpha-tocopherol are much better than with zinc powder. However, a much greater amount of stannous chloride is required, expressed both by weight and bulk, than is desirable. Also, the overall cost of the stannous chloride is much greater than desired.

SUMMARY OF THE INVENTION

In accordance with the present invention, the disadvantages of the prior art are overcome by converting a mixed tocopherol concentrate (containing at least one of beta, gamma and delta-tocopherols) to essentially all alpha-tocopherol by reacting with the mixed tocopherol concentrate an aldehyde, such as Formalin or paraformaldehyde, and a hydrogen halide such as hydrogen chloride or bromide in the presence of metallic tin as a reducing agent. The metallic tin has been found to improve conversion and yield substantially compared to zinc; and tin has the advantages over stannous chloride of equivalent conversion and yield with much smaller bulk and much less weight, and at a much smaller overall cost.

In performing my novel process, the molar ratio of tin to tocopherols in the starting concentrate material (expressed as gamma-tocopherol) desirably is between 1 and 1.4 to 1. The molar ratio of the aldehyde to the tocopherols (expressed as gamma-tocopherol) desirably is between 1.5 and 4 to 1.

The reaction can be conducted at low temperatures such as room temperature, or at the reflux temperature of a solvent forming part of the reaction mixture, e.g. at 62° C. when using isopropyl ether.

THE PREFERRED EMBODIMENTS

The principles of the invention will be described in more detail below as examples of specific conversions, along with comparative examples wherein either stannous chloride or zinc is used as the reducing agent. All percentages are by weight.

EXAMPLE 1

To a solution of 42.2 grams of mixed tocopherol concentrate (assaying 5.1% alpha, 22.7% gamma/beta, and 9.5% delta-tocopherols) in 210 ml. of isopropyl ether were added 2.5 grams of paraformaldehyde. This mixture was stirred in a 500 ml. flask fitted with a reflux condenser while adding 32 ml. of concentrated hydrochloric acid. The contents were heated at 45 to 50° C. and 6.66 grams of tin dust were added gradually over 15 minutes. After 5 minutes one gram of paraformaldehyde was added and heating and stirring were continued for 3.5 hours. The reaction mixture was then diluted with water and extracted with ether. The ether extract containing the alpha-tocopherol was washed several times with water, was dried over anhydrous sodium sulfate, and the ether was then evaporated to give 44.2 grams of an oily residue assaying 32.7% tocopherol, all of which was alpha-tocopherol [E(1%, 1 cm.) (292 m$\mu$)=33.0]. The tocopherol recovery was 91% based on the total tocopherols in the starting concentrate.

In the other examples, essentially the same procedure was followed as in Example 1 and the results are tabulated in Tables I and II below.

TABLE I

| Example | Percent comp. of concentration | | | Mole ratio/(to 1 mole tocopherols) [1] | | Reaction time, hrs. | Percent alpha-tocopherol in product | Percent tocopherol recovery [2] |
|---|---|---|---|---|---|---|---|---|
| | Alpha | Beta/gamma | Delta | p-Formaldehyde | Reducing agent | | | |
| 1 | 5.1 | 22.7 | 9.5 | 2.8 | 1.34 Sn | 3.8 | 32.7 | 91 |
| 2 | 5.1 | 22.7 | 9.5 | 2.4 | 2.6 SnCl$_2$ | 2.5 | 31.7 | 89 |
| 3 | 5.3 | 23.8 | 10.3 | 2.8 | 1.34 Sn | 5.0 | 32.9 | 87 |
| 4 | 6.5 | 23 | 10 | 3.6 | 1.34 Sn | 4.5 | 32.9 | 88 |
| 5 | 6.5 | 23 | 10 | 2.6 | 2.6 SnCl$_2$ | 3.0 | 31.0 | 81 |
| 6 | 2 | 58 | 25 | 2.9 | 1.38 Sn | 4.0 | 73.5 | 90 |
| 7 | 2 | 58 | 25 | 5.4 | 3.7 SnCl$_2$ | 6.0 | 70 | 86 |

[1] Total mixed tocopherols in starting mixture, expressed as gamma tocopherol.
[2] Based on total tocopherols in starting concentrate.

TABLE II.—COMPARISON OF REACTION PRODUCTS FROM SAME FEED MATERIAL

| Example | Reducing agent | Percent comp. of concentration | Percent comp. of product | | | Percent total recovery [1] | |
|---|---|---|---|---|---|---|---|
| | | | Alpha | Beta/ gamma | Delta | Total | Alpha |
| 1 | Sn | b | 32.7 | 0 | 0 | 91 | 91 |
| 8 | Zn | b | 26 | 7 | 0.1 | 87 | 69 |
| 3 | Sn | a | 32.9 | 0 | 0 | 87 | 87 |
| 9 | Zn | a | 26 | 7 | 0.1 | 86 | 67 |

[1] Based on total tocopherols in starting concentrate.

NOTE.—a=5.3 alpha, 23.8 beta/gamma, 10.3 delta; EE=429 mg./g.; b=5.1 alpha, 22.7 beta/gamma, 9.5 delta; EE=425 mg./g.

From the results in the above Tables I and II it is evident that the process of my invention (powdered tin used as reducing agent) gave a much better conversion and yield than did powdered zinc. Furthermore, the bulk and weight of tin is much less than the stannous chloride required for approximately equivalent results. The tin provides about 3.8 times the reducing capacity of stannous chloride ($SnCl_2 \cdot 2H_2O$) on a weight basis. Although tin is more expensive (currently $1.80 per pound) than stannous chloride (currently $1.30 per pound for $SnCl_2 \cdot 2H_2O$), the total cost with tin is much less than with stannous chloride. Furthermore, there is a saving in the bulk volume of reducing agent by a 10 to 1 ratio based on the specific gravities of tin at 7.31 and of stannous chloride at 2.71 for $SnCl_2 \cdot 2H_2O$.

The invention has been described in detail with particular reference to preferred embodiments thereof, but it will be understood that variations and modifications can be effected within the spirit and scope of the invention.

I claim:

1. A process for converting a mixed tocopherol concentrate containing non alpha-tocopherol to essentially all alpha-tocopherol which comprises reacting with said mixed tocopherol concentrate an aldehyde and a hydrogen halide in the presence of metallic tin as a reducing agents.

2. A process in accordance with claim 1 wherein said mixed tocopherol concentrate contains at least one selected from the group consisting of beta, gamma, and delta tocopherols.

3. A process in accordance with claim 1 wherein said aldehyde is paraformaldehyde and said hydrogen halide is hydrogen chloride.

4. A process in accordance with claim 1 wherein said metallic tin is in the form of tin powder.

5. A process in accordance with claim 1, also comprising recovering an essentially all alpha-tocopherol concentrate from the reaction mixture as product.

References Cited

UNITED STATES PATENTS 2,486,542    11/1949    Weisler et al. _____ 260—345.5
2,843,604    7/1958     Hawks _____ 260—345.5

JOHN M. FORD, Primary Examiner